(No Model.) 2 Sheets—Sheet 1.
J. P. SIMONS.
Apparatus for and Process of Molding Large Articles of Earthenware.
No. 242,996. Patented June 14, 1881.
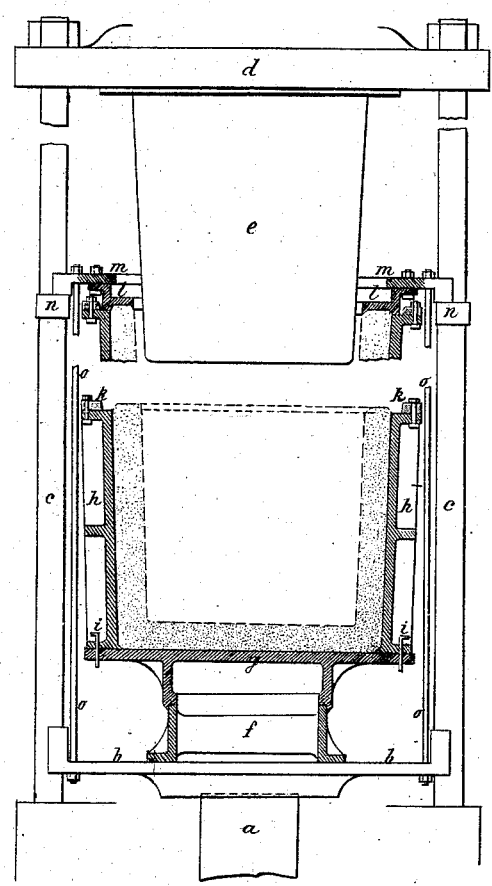
Fig: 1
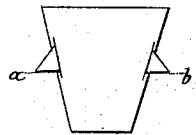
Fig: 2
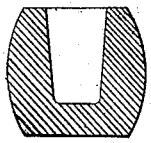
Fig: 3
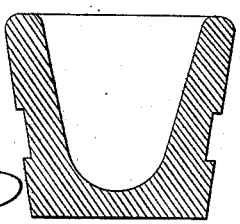
Fig: 4
Witnesses:
1. R. M. Hooper
2. Jean-Baptiste Rolland
Inventor:
Jean Paul Simon
av Briesen
attorney (No Model.)
2 Sheets—Sheet 2.
J. P. SIMONS.
Apparatus for and Process of Molding Large Articles of Earthenware.
No. 242,996.
Patented June 14, 1881.
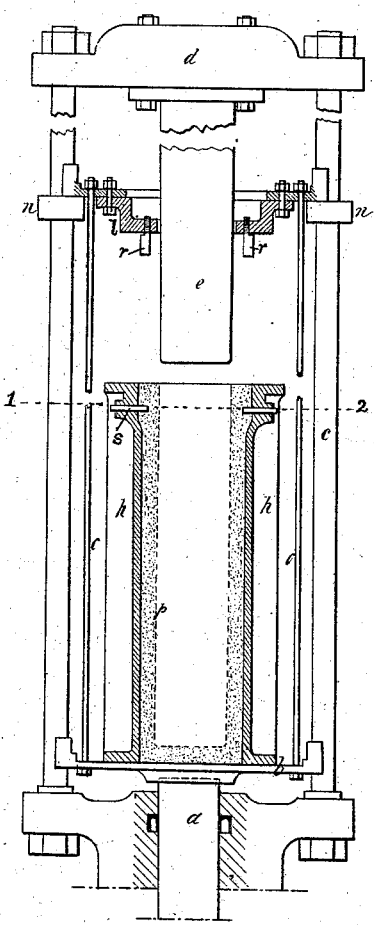
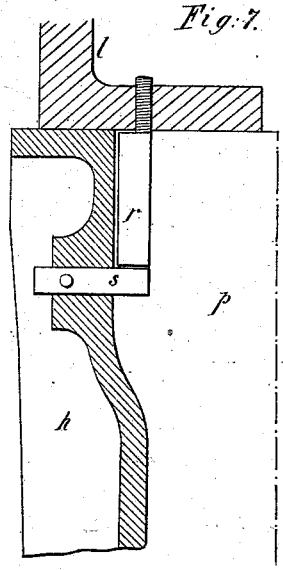
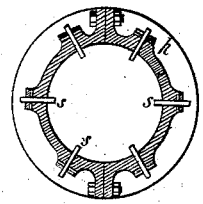

United States Patent Office.

JEAN P. SIMONS, OF LE CATEAU, FRANCE.

APPARATUS FOR AND PROCESS OF MOLDING LARGE ARTICLES OF EARTHENWARE.

SPECIFICATION forming part of Letters Patent No. 242,996, dated June 14, 1881.

Application filed March 7, 1881. (No model.) Patented in France March 10, 1880.

*To all whom it may concern:*

Be it known that I, JEAN PAUL SIMONS, of Le Cateau, (Nord,) France, have invented an Improved Process of and Apparatus for Molding Large Articles of Earthenware, (for which a French patent, No. 135,503, for fifteen years from March 10, 1880, has been granted me;) and I do hereby declare that the following is a full, clear, and exact description of the same, reference being had to the annexed sheets of drawings, making a part of the same.

The process and apparatus for which I make the present application for a patent are principally characterized by the employment of a mold of special construction, which is formed by the combination of different pieces or organs, as will hereinafter be explained.

This new system of mold, combined with appropriate molding apparatus, enables me to obtain all kinds of forms and shapes known in ceramic work as "contenants," no matter what may be their exterior configuration or dimensions.

By means of my system any variety of form may be obtained by the same molding-machine, and the work is rapidly and well performed.

The peculiar kind of mold which I employ for the fabrication of large pieces invariably consists of three parts: first, the bottom, consisting of a table, perfectly level, which serves indifferently for all the pieces to be formed, and on which is placed the mold; second, the mold itself, or lateral envelope, consisting of one or of several parts fastened together by bolts and hinges, the interior surface of the said mold representing the exterior form of the piece to be molded; third, a circular piece called a "cover," which closes the mold at the top, the interior surface of which gives to the top of the piece to be molded the particular form it is intended to assume. Thus by a peculiar construction of the cover I am enabled to produce the bolt-holes in gas-retorts, the convex shape of glass-melting pots, &c.

My system will be better understood by referring to the accompanying drawings, which represent two different arrangements of my machine, with several figures, showing some of the external forms, which may be obtained by the use of my improved system of molding.

Figure 1 represents the general arrangement of this system of mold, the mold being placed on the table of the hydraulic press, and containing a glass-melting pot. Figs. 2, 3, and 4 show different forms of recipients, which may be made by the same machine by simply changing the lateral envelope or mold proper and its cover. Fig. 5 represents the arrangement of a similar hydraulic press, adapted to the molding of gas-retorts, which are, as is well known, of considerable height. Fig. 6 shows a section of the mold on the line 1 2 of Fig. 5. Fig. 7 shows, on a larger scale, the details of a part of the upper edge of the mold, with its cover arranged so as to form the bolt-holes of gas-retorts.

In the different figures the same letters of reference indicate the same parts.

As is seen in Fig. 1, the apparatus is composed of a table or tray, $b$, fixed on the piston $a$ of a hydraulic press. The table or tray terminates at each end in a guide which slides in the uprights $c$, forming the frame of the press. These uprights are joined together at the top by a platform or table, $d$, to which is fixed the molding apparatus $e$. On the table or tray $b$ is fixed a support, $f$, which receives the bottom of the mold $g$, which can, if desired, be made to move horizontally on the said support. On this bottom $g$, which is perfectly level, is placed the mold proper or lateral envelope, $h$, which is fixed, by means of wedges $i$, on the table or tray $g$. A circle, $k$, placed on the top of the envelope $h$, guides the cover, and keeps it in a proper position when the mold or envelope is pressed against the said cover.

The cover $l$ (the under surface of which is of the same shape as the upper surface of the article to be molded) is fixed to an annular plate, $m$, arranged, like the plate $b$, so as to slide in the uprights $c$. The plate $m$, and consequently the cover $l$, are fixed at the required height, and are there maintained by the stop-pieces $n$, arranged on the said uprights $c$.

The molding operation is effected as follows: The necessary quantity of clay being placed in the mold $h$, and the cover being fixed at the desired height, the piston of the press is set in motion, so as to raise the mold into which the molding apparatus penetrates so far as to come into contact with the cover, the said contact taking place before the earth touches the molding apparatus. At this moment, in order to assure perfect contact and to cause the three different parts of the mold to form a compact whole, provided with guides, as above described, the two tables or trays $m$ and $b$ are bolted together by the bolts $o$, which are tightened by means of nuts. The piston is then raised until the piece is completely molded. The waste earth leaves the mold through the annular opening between the cover and the molding apparatus. The size of the opening depends on the kind of earth used. In order to release the molded article, and to submit it to a drying process, it is only necessary to withdraw the bolts $o$. The cover $l$ remains suspended with its table $m$, and the molded article descends with its envelope $h$, and is removed with it from the table $g$ and carried to the place set apart for drying.

Fig. 5 represents the same apparatus arranged for the molding of gas-retorts. In this case the cover $l$ is provided with pins $r$, fixed in any convenient way, and corresponding with other pins, $s$, fixed horizontally to the upper part of the mold $h$. As already mentioned, this arrangement serves to form the bolt-holes in the upper part of the gas-retort. With the exception of these modifications, which will be clearly understood by referring to Sheet II, the working of the machine is identically the same as that described and represented in Fig. 1, and is quite as simple.

I claim—

1. The combination of the annular cover $l$, with the plate $m$, the stops $n$, and the bolts $o$, which serve to unite tightly the said cover to the table of the hydraulic press, so as to obtain a compact whole having guides above and below, as and for the purpose described.

2. In apparatus for molding gas-retorts, the combination of the annular cover $l$, having pins $r$, for forming bolt-holes in the upper part of the molded piece, with the horizontal pins $s$, fixed to the upper part of the mold $h$, and corresponding with the pins $r$, all arranged substantially as and for the purpose described.

JEAN PAUL SIMONS.

Witnesses:
ROBT. M. HOOPER,
JEAN BAPTISTE ROLLAND.